United States Patent
Pan et al.

(10) Patent No.: US 10,378,645 B2
(45) Date of Patent: Aug. 13, 2019

(54) METHOD, SYSTEM, AND SENSOR APPARATUS FOR DETECTING ROTATIONAL SPEED OF A GEAR ASSEMBLY

(71) Applicant: HAMLIN ELECTRONICS (SUZHOU) CO. LTD., Jiangsu (CN)

(72) Inventors: Shangchun Pan, Jiangsu (CN); Bens Xie, Jiangsu (CN); Guiting Chu, Jiangsu (CN)

(73) Assignee: HAMLIN ELECTRONICS (SUZHOU) CO. LTD., Jiangsu (CN)

( * ) Notice: Subject to any disclaimer, the term of this patent is extended or adjusted under 35 U.S.C. 154(b) by 0 days.

(21) Appl. No.: 15/566,982

(22) PCT Filed: Apr. 17, 2015

(86) PCT No.: PCT/CN2015/076821
§ 371 (c)(1),
(2) Date: Oct. 16, 2017

(87) PCT Pub. No.: WO2016/165117
PCT Pub. Date: Oct. 20, 2016

(65) Prior Publication Data
US 2018/0080544 A1  Mar. 22, 2018

(51) Int. Cl.
*G01B 7/30* (2006.01)
*F16H 61/00* (2006.01)
(Continued)

(52) U.S. Cl.
CPC ......... *F16H 61/0003* (2013.01); *F16H 59/38* (2013.01); *F16H 59/68* (2013.01); *G01D 5/142* (2013.01)

(58) Field of Classification Search
CPC .. F16H 61/22; F16H 2061/1208; F16H 59/08; F16H 2061/0087; F16H 61/12;
(Continued)

(56) References Cited

U.S. PATENT DOCUMENTS 5,737,188 A  4/1998 Flierl et al.
6,527,096 B2 * 3/2003 Hoess .................. B60T 1/005
188/3 H
(Continued)

FOREIGN PATENT DOCUMENTS

CN  85103569 A  11/1986
CN  102042841 A  5/2011
(Continued)

OTHER PUBLICATIONS

European Search Report for the European Patent Application No. 15888822, dated Nov. 6, 2018.

*Primary Examiner* — Vinh P Nguyen

(57) ABSTRACT

Provided are approaches for incorporating a plurality of sensors within a housing assembly coupled to a gear assembly. In one approach, a sensor apparatus includes a housing assembly including a first section and a second section coupled to the first section, and a set of speed sensors disposed within the first section. In one approach, the set of speed sensors is configured to detect rotational speed of one or more gears of the gear assembly. The sensor apparatus further includes a position sensor disposed within the second section. In one approach, the position sensor is configured to detect a position of a park lock element. The sensor apparatus further includes a printed circuit board (PCB) disposed within the housing assembly, wherein the set of speed sensors and the position sensors are connected to the PCB.

20 Claims, 12 Drawing Sheets

(51) Int. Cl.
*F16H 59/38* (2006.01)
*F16H 59/68* (2006.01)
*G01D 5/14* (2006.01)

(58) Field of Classification Search
CPC ............... F16H 61/0213; F16H 61/061; F16H 2061/0078; F16H 59/0204; F16H 59/72; F16H 61/0003; F16H 2061/1204; F16H 61/01; F16H 59/16; F16H 2059/683; F16H 2342/04; F16H 61/0204; F16H 61/0251; F16H 61/0437; F16H 61/21; F16H 63/3416; F16H 61/18; F16H 2059/144; B60W 10/04; B60W 30/1819; B60L 2240/441; B60L 2240/461; B60L 2240/465; B60L 7/14; B60L 8/00; B60L 15/20; B60L 15/2009; B60L 2240/12; B60L 2240/14; B60L 2240/32; B60L 2240/421; B60L 2240/03; G01D 5/142; G01D 5/145; H02K 16/04; H02K 21/22; H02K 29/00; H02K 3/28
See application file for complete search history.

(56) References Cited

U.S. PATENT DOCUMENTS

| | | | |
|---|---|---|---|
| 7,165,398 B1* | 1/2007 | Holder | F16D 31/02 60/487 |
| 7,568,404 B2* | 8/2009 | Grossman | F16H 59/0204 74/473.21 |
| 9,145,126 B2* | 9/2015 | Kinoshita | B60K 28/12 |
| 2004/0263099 A1* | 12/2004 | Maslov | B60L 11/126 318/400.24 |

FOREIGN PATENT DOCUMENTS

| | | |
|---|---|---|
| CN | 102069892 A | 5/2011 |
| CN | 104380050 A | 2/2015 |
| DE | 102006034946 A1 | 1/2008 |
| EP | 2713079 A1 | 2/2014 |

* cited by examiner

METHOD, SYSTEM, AND SENSOR APPARATUS FOR DETECTING ROTATIONAL SPEED OF A GEAR ASSEMBLY

FIELD OF THE DISCLOSURE

The disclosure relates generally to the field of sensors and, more particularly, to a device and method for providing a modular sensor apparatus for a gear assembly.

BACKGROUND OF THE DISCLOSURE

With both automatic and manual transmission engines, a variety of sensors are employed to provide real time data regarding the current positions of the actuators, the associated shift linkages, as well as the clutches, brakes, and gears acted upon. Such data is utilized by a transmission control module (TCM) to confirm, for example, the commencement and completion of a shift and thus the overall state of the transmission. Such data is also useful for self-diagnosis of impending or actual component failure.

In an automatic gear (ratio) shifting system, sensors provide the necessary data to the TCM regarding speed, direction, position, etc., of one or more gears in the system. Current approaches provide these sensors individually as part of a stand-alone, independent assembly system. This can be problematic, for example, when multiple sensors and sensor assembly systems are incorporated into a confined area of the system. In the case of a dual clutch manual transmission in which multiple sensors are employed in close proximity, physical space constraints may prevent one or more of the sensors from being optimally positioned about the transmission, thus limiting overall effectiveness.

SUMMARY

In view of the foregoing, it would be advantageous to provide a system and method including a modular sensor apparatus for a gear assembly that incorporates a plurality of sensors within the housing, thus satisfying space constraints and optimizing placement of each sensor. Moreover, it would be advantageous to provide such a system and method that reduce overall cost and improve ease of assembly.

An exemplary sensor apparatus for a gear assembly in accordance with the present disclosure may include a housing assembly including a first section and a second section coupled to the first section, and a set of speed sensors disposed within the first section, wherein the set of speed sensors is configured to detect rotational speed of one or more gears of the gear assembly. The sensor apparatus may further include a position sensor disposed within the second section, wherein the position sensor is configured to detect a position of a park lock element. The sensor apparatus may further include a first printed circuit board (PCB) disposed within the housing assembly, wherein the set of speed sensors and the position sensor are connected to the first PCB.

An exemplary sensor system for a gear assembly in accordance with the present disclosure may include a set of speed sensors disposed within a first section of a housing assembly, the set of speed sensors configured to detect rotational speed of one or more gears of the gear assembly. The sensor system may further include a position sensor disposed within a second section of the housing assembly, the position sensor configured to detect a position of a park lock element, wherein the set of speed sensors and the position sensor are electrically connected to a first printed circuit board (PCB) disposed within the first section of the housing assembly.

An exemplary method for monitoring a gear assembly may include providing a set of speed sensors within a first section of a housing assembly, the set of speed sensors configured to detect rotational speed of one or more gears of the gear assembly. The method may further include providing a position sensor within a second section of the housing assembly, wherein the position sensor is configured to detect a position of a park lock element. The method may further include electrically connecting the set of speed sensors and the position sensor to a first printed circuit board (PCB) disposed within the first section of the housing assembly.

Figure 1:
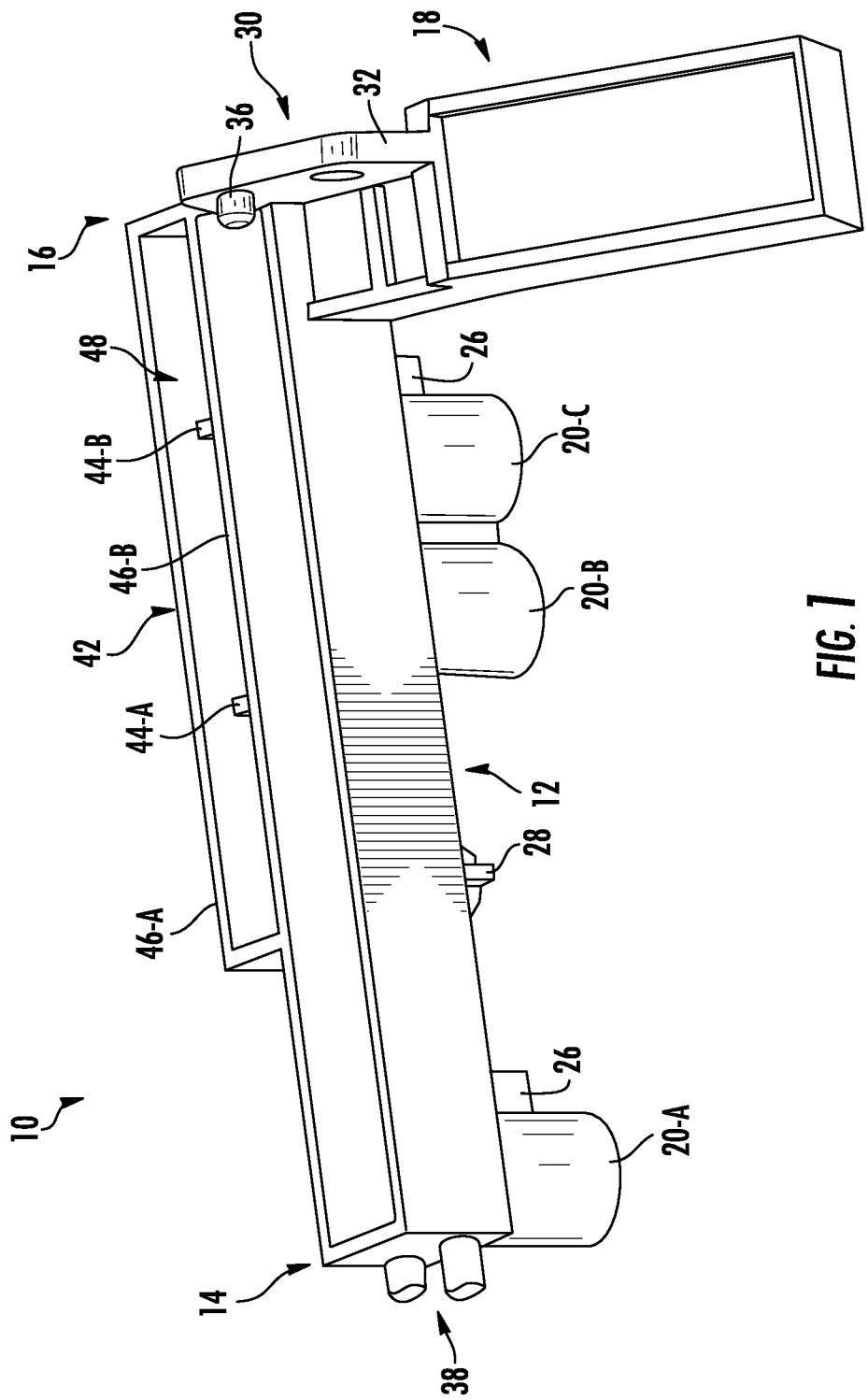
FIG. 1 is an isometric view illustrating a housing assembly according to exemplary embodiments.
Figure 2:
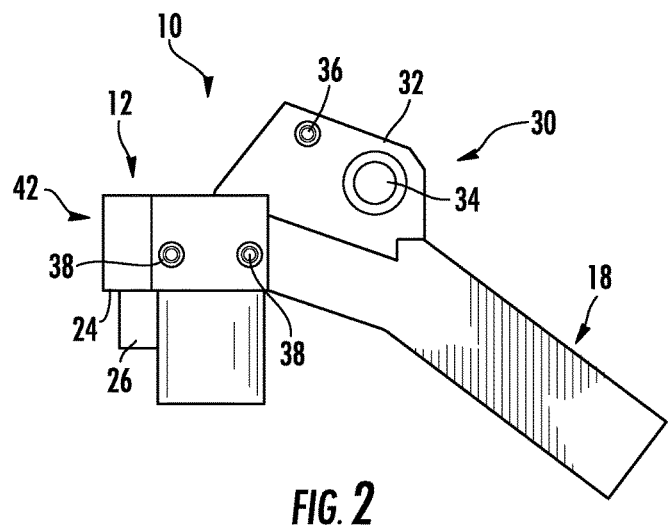
FIG. 2 is a side view illustrating the housing assembly shown in FIG. 1 according to exemplary embodiments.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

DETAILED DESCRIPTION

A system and method in accordance with the present disclosure will now be described more fully hereinafter with reference to the accompanying drawings, in which embodiments of the system and method are shown. The system and method, however, may be embodied in many different forms and should not be construed as being limited to the embodiments set forth herein. Rather, these embodiments are provided so that this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts, each with respect to the geometry and orientation of a sensor apparatus and/or housing assembly as they appear in FIGS. 1-12. Said terminology will include the words specifically mentioned, derivatives thereof, and words of similar import.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

As stated above, provided herein are approaches for incorporating a plurality of sensors within a housing assembly coupled to a gear assembly. In one approach, a sensor apparatus includes a housing assembly including a first section and a second section coupled to the first section, and a set of (i.e., one or more) speed sensors disposed within the first section. In one approach, the set of speed sensors is configured to detect rotational speed of one or more gears of the gear assembly. The sensor apparatus further includes a position sensor disposed within the second section. In one embodiment, the position sensor is configured to detect a position of a park lock element. The sensor apparatus further includes a first printed circuit board (PCB) disposed within the housing assembly, wherein the set of speed sensors and the position sensors are connected to the first PCB.

Referring to FIGS. 1-4, an exemplary embodiment of a housing assembly 10 in accordance with the present disclosure is shown. The exemplary housing assembly 10 described herein is used for housing a plurality of sensors used to monitor components of a gear assembly, as will be described in greater detail below. The housing assembly 10 is designed to save space and to reduce cost and complexity as compared to traditional approaches that use individual mounting assemblies to affix each sensor to the gear assembly.

As demonstrated, the housing assembly 10 includes a first section 12 having a first end 14 and a second end 16, and a second section 18, wherein the second section 18 is coupled to the first section 12 at the second end 16. In an exemplary embodiment, second section 18 is arranged substantially perpendicular to the first section 12. However, it will be appreciated that such arrangement is not limiting, and that in other embodiments, the overall shape of the housing assembly 10 may vary depending on a particular gear assembly being monitored.

The housing assembly 10 further includes a plurality of sensor canisters 20A-C, each configured to receive a speed sensor. As shown, each sensor canister 20A-C is coupled to the first section 12 of the housing assembly 10, and extends perpendicularly away from a bottom surface 24 of the first section 12. The plurality of sensor canisters 20A-C may be cylindrically shaped and arranged along the first section 12 as shown, wherein sensor canister 20A proximate first end 14 is off-set from sensor canisters 20B-C. However, in another embodiment, the sensor canisters may be alternatively arranged, for example, based on the particular gear assembly being monitored.

Figure 3:
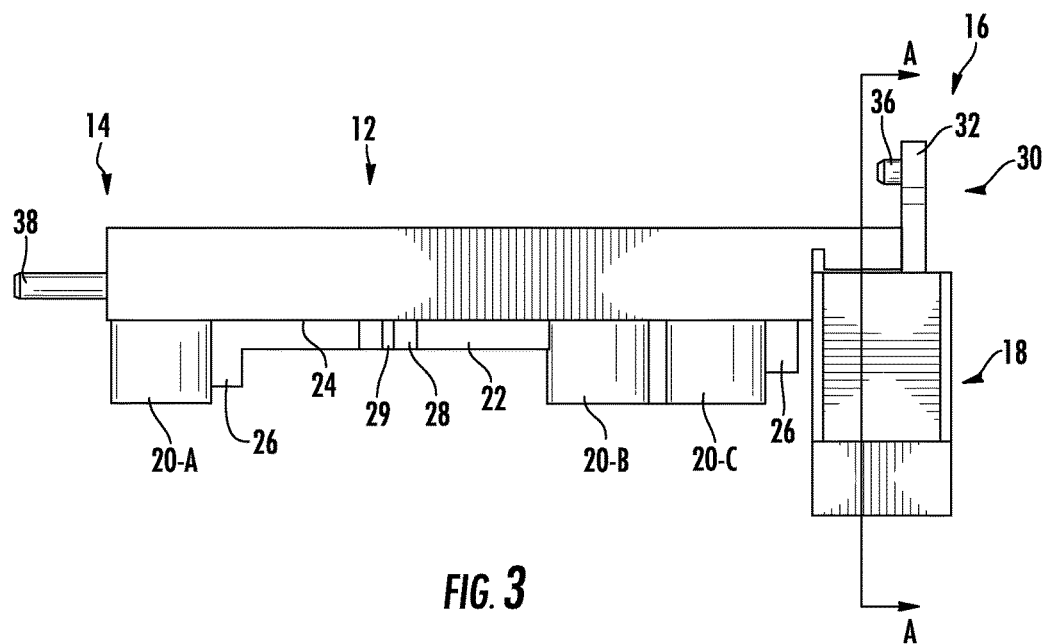
FIG. 3 is a front view illustrating the housing assembly shown in FIG. 1 according to exemplary embodiments.
Figure 4:
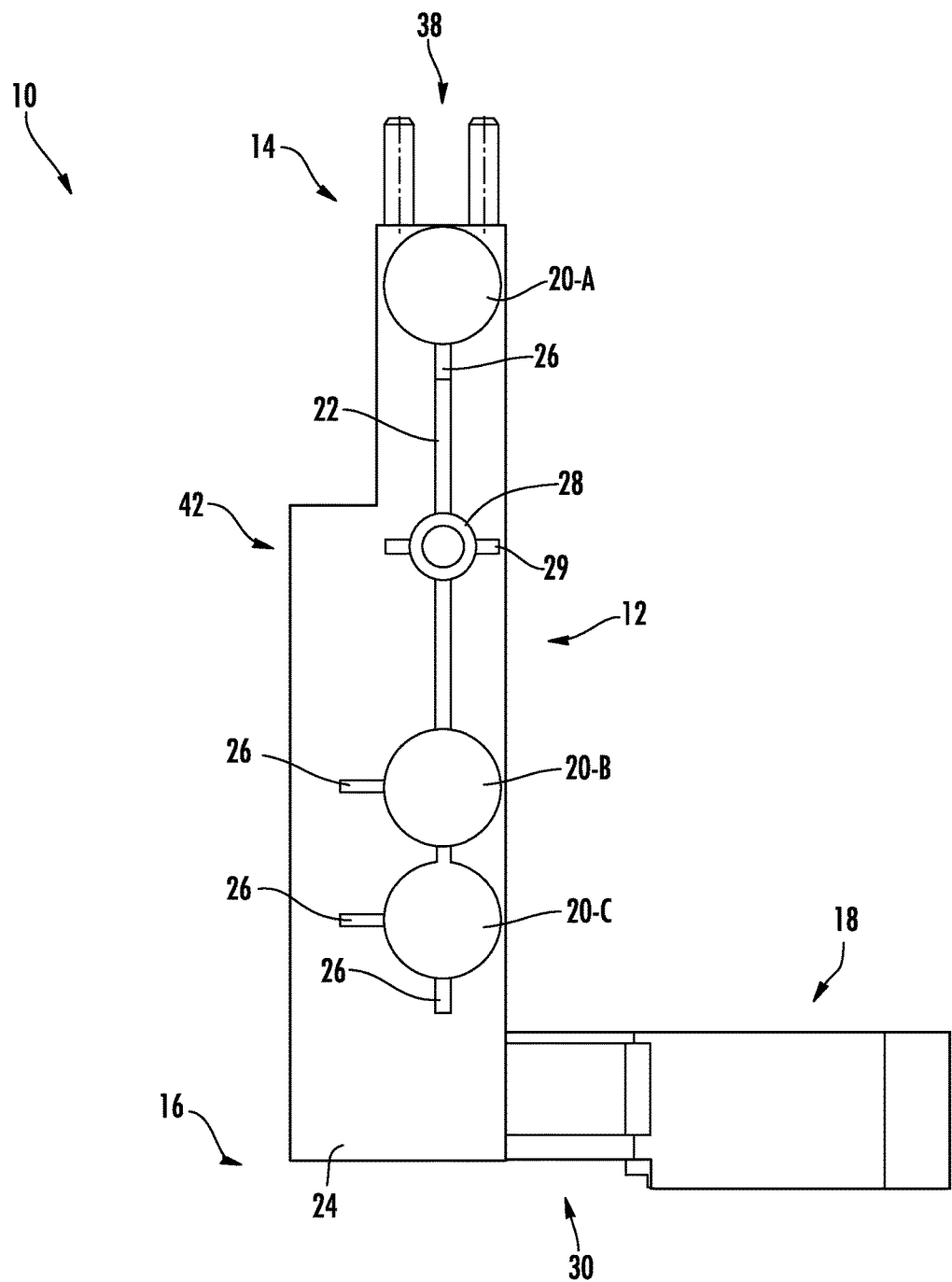
FIG. 4 is a bottom view illustrating the housing assembly shown in FIG. 1 according to exemplary embodiments.
Figure 5:
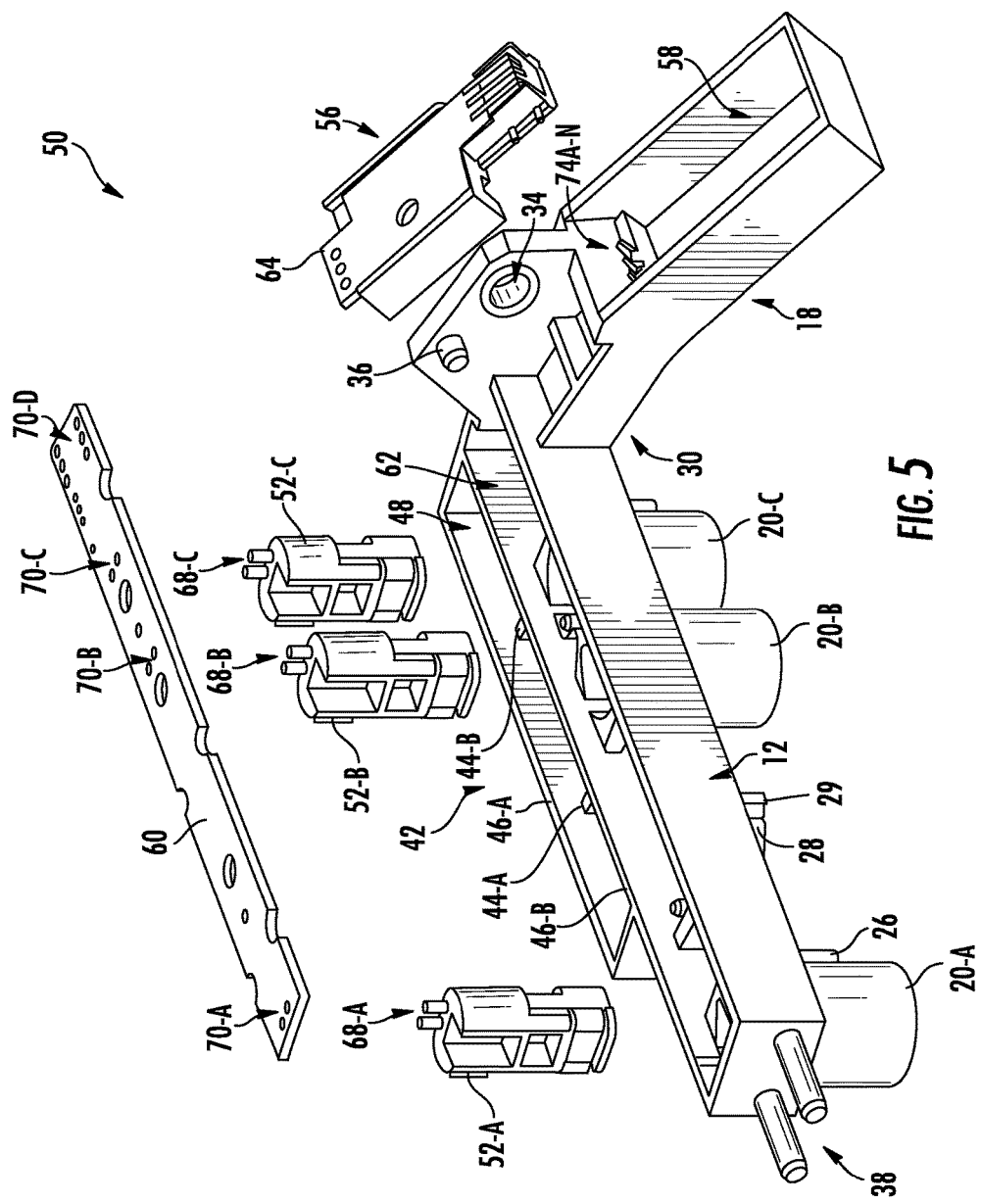
FIG. 5 is an exploded isometric view illustrating a sensor apparatus including a set of speed sensors and a position sensor together with the housing assembly shown in FIG. 1 according to exemplary embodiments.
Figure 6:
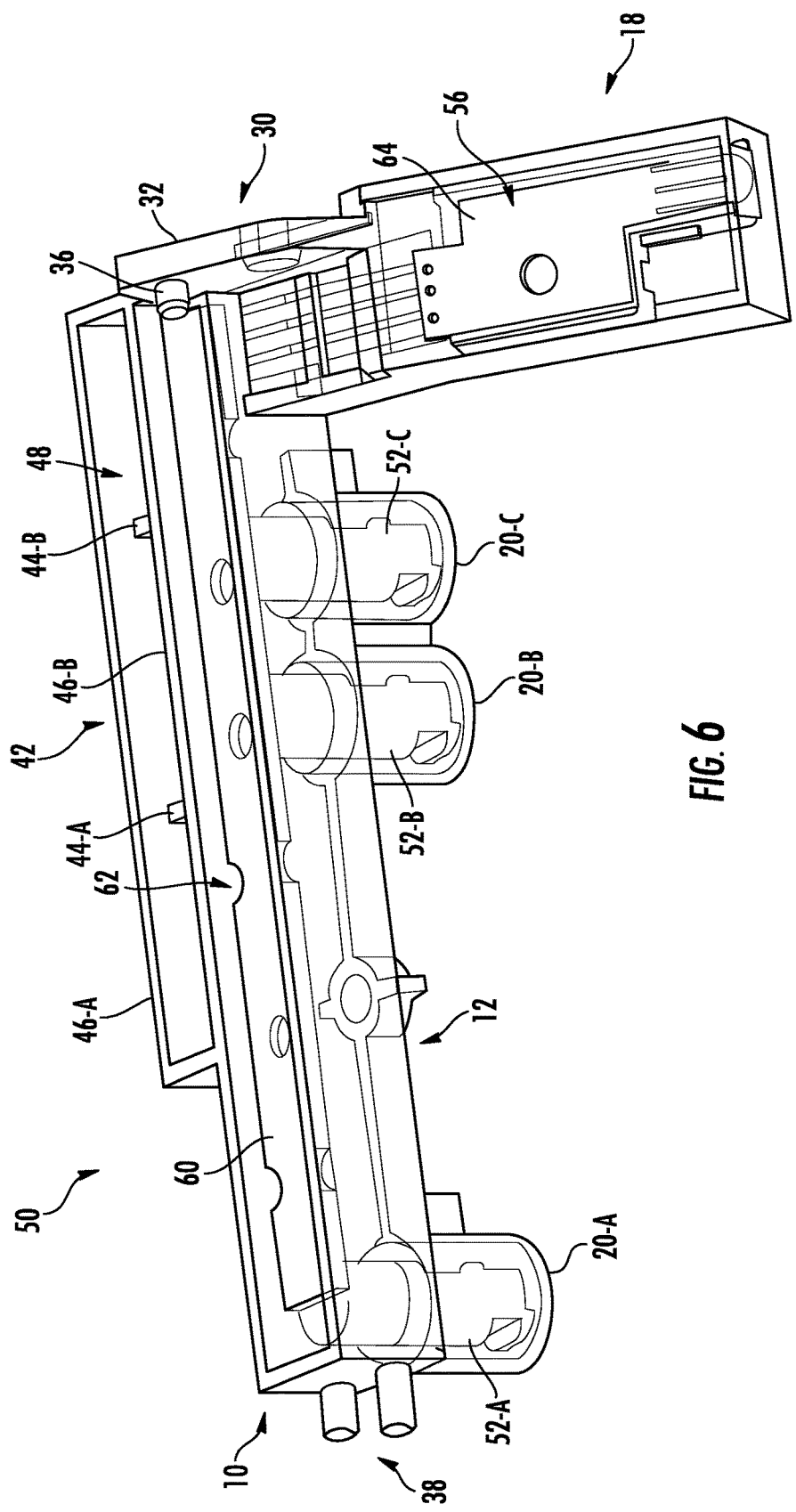
FIG. 6 is an isometric semi-transparent view illustrating the sensor apparatus shown in FIG. 5 according to exemplary embodiments.
Figure 7:
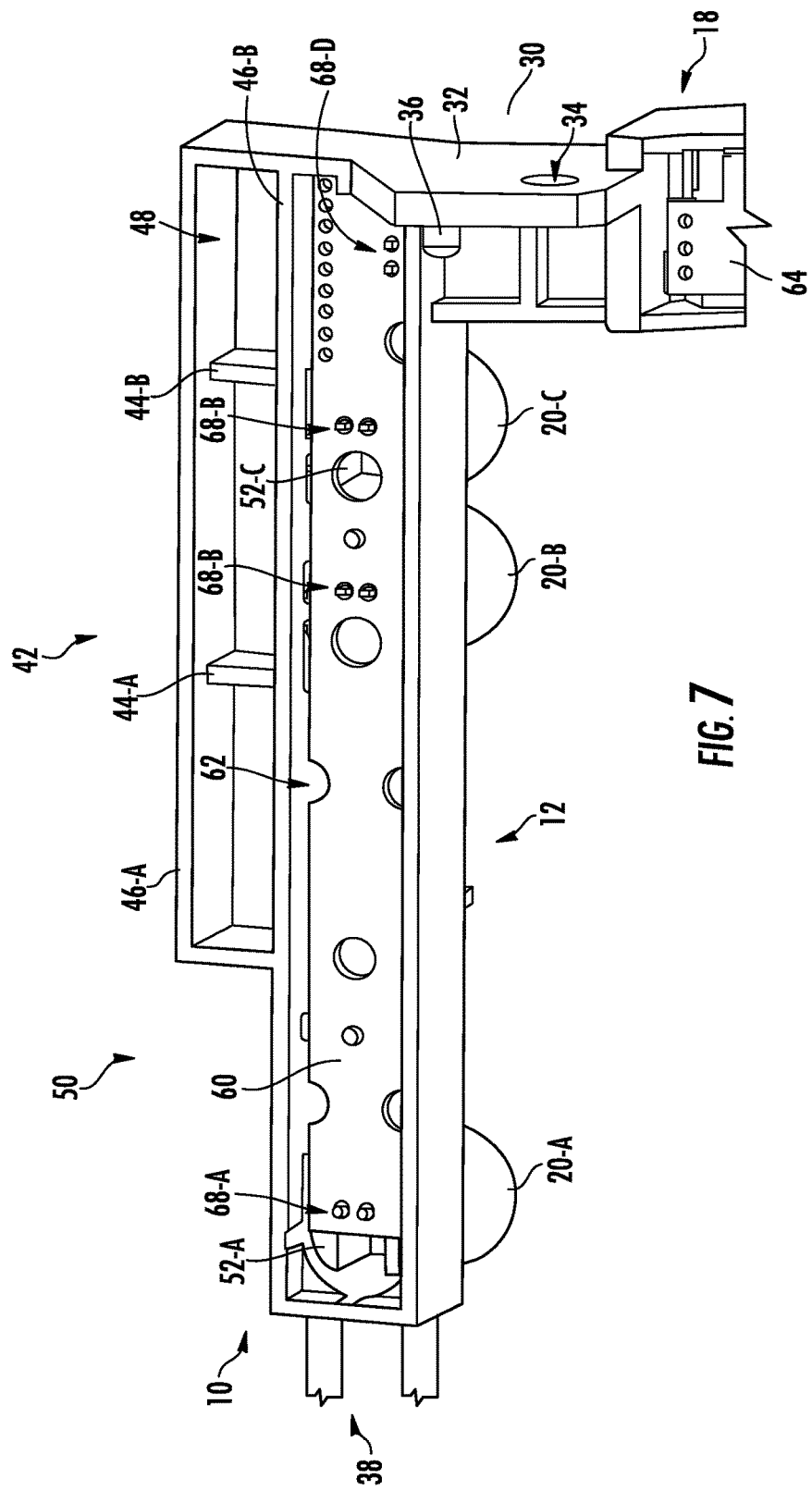
FIG. 7 is an isometric view illustrating a printed circuit board of the sensor apparatus shown in FIG. 6 according to exemplary embodiments.

As more clearly shown in FIGS. 3-4, the sensor canisters 20A-C are coupled to a support rib 22 extending along the bottom surface 24 of the first section 12 between the first end 14 and the second end 16. Support rib 22 may comprise a rectangular shaped, rigid framing element oriented perpendicular to the bottom surface 24. In some embodiments, support rib 22 includes a circular support member 28 coupled to the bottom surface 24 and positioned between sensor canisters 20A-B. The circular support member 28 includes one or more radial support elements 29 oriented perpendicular to the support rib 22. Support rib 22, including circular support member 28 and the radial support elements 29, is provided to minimize deformation of the first section 12.

In one embodiment, each sensor canister 20A-C includes one or more radial support elements 26 extending from an outer surface thereof, wherein each sensor canister 20A-C is coupled to the bottom surface 24 of the first section 12. The radial support elements 26 add stability to the sensor canisters 20A-C. In exemplary embodiments, one or more of the radial support elements 26 coupled to sensor canisters 20B-C are oriented perpendicular to the support rib 22, while one or more of the radial support elements 26 coupled to the sensor canisters 20A and 20C are aligned with, and extend along the support rib 22. This arrangement, however, is not limiting.

Referring again to FIGS. 1-4, the housing assembly 10 further includes a shoulder region 30 disposed at an intersection of the first section 12 and the second section 18. The shoulder region 30 includes a support plate 32 having a mounting screw hole 34 and a pin 36 for mounting the housing assembly 10 to a gear assembly cover at the second end 16, as will be shown and described in greater detail below. The housing assembly 10 further includes a set of pins 38 coupled to the first end 14 of the first section 12 for coupling the housing assembly 10 to the gear assembly cover.

The housing assembly 10 further includes a third section 42 coupled to the first section 12. As shown, the third section 42 includes a set of support members 44A-B extending between sidewalls 46A-B within a cavity 48 of the third section 42. The third section 42 provides additional support and rigidity to housing assembly 10. In one embodiment, the radial support elements 26 of sensor canisters 20A-B are coupled to the third section 42 along the bottom surface 24 of the first section 12, as more clearly shown in FIG. 4.

Referring now to FIGS. 5-8, an exemplary embodiment of a sensor apparatus 50 including a plurality of sensors within the housing assembly 10 is shown. The sensor apparatus 50 includes a set of (i.e., one or more) speed sensors 52A-C disposed within corresponding sensor canisters 20A-C of the first section 12 of the housing assembly 10. In an exemplary embodiment, the speed sensors 52A-C are configured to detect rotational speed of one or more gears of a gear assembly. Specifically, the speed sensors 52A and 52C may be transmission input shaft speed sensors (TISS) used to sense the instantaneous speed of an input shaft of a manual transmission gear assembly. Meanwhile, speed sensor 52B may be a transmission output shaft speed sensor (TOSS) used to sense the instantaneous speed of the output shaft of the manual transmission gear assembly. Data resulting from speed sensors 52A-C may then be output to a transmission control unit (not shown).

Sensor apparatus 50 further includes a position sensor 56 disposed within a cavity 58 of the second section 18 of the housing assembly 10. In an exemplary embodiment, the position sensor 56 is configured to detect a position of a park lock element operable with a gear assembly. Specifically, the position sensor 56 may be a magnetic sensing device, which can detect the presence of a ferromagnetic object, such as a park lock element, in its vicinity. The position sensor 56 may utilize a magnetic field and employ a sensing component that detects changes in the strength of the magnetic field. Operation of the position sensor 56 with respect to the park lock element will be described in greater detail below.

Sensor apparatus 50 further includes a first PCB 60 disposed within a cavity 62 of the first section 12 of the housing assembly 10, and a second PCB 64 disposed within the cavity 58 of the second section 18 of the housing assembly 10. The first PCB 60 is configured to connect each of speed sensors 52A-C and 56 therein. In one embodiment, as more clearly shown in FIGS. 5 and 7, each of the speed sensors 52A-C and 56 includes a set of terminals 68A-D for engaging a set of corresponding openings 70A-D in the first PCB 60. Terminals 68A-D extend though openings 70A-D and, once coupled, e.g., by use of soldering joints, electrically connect the speed sensors 52A-C with the position sensor 56.

Figure 8:
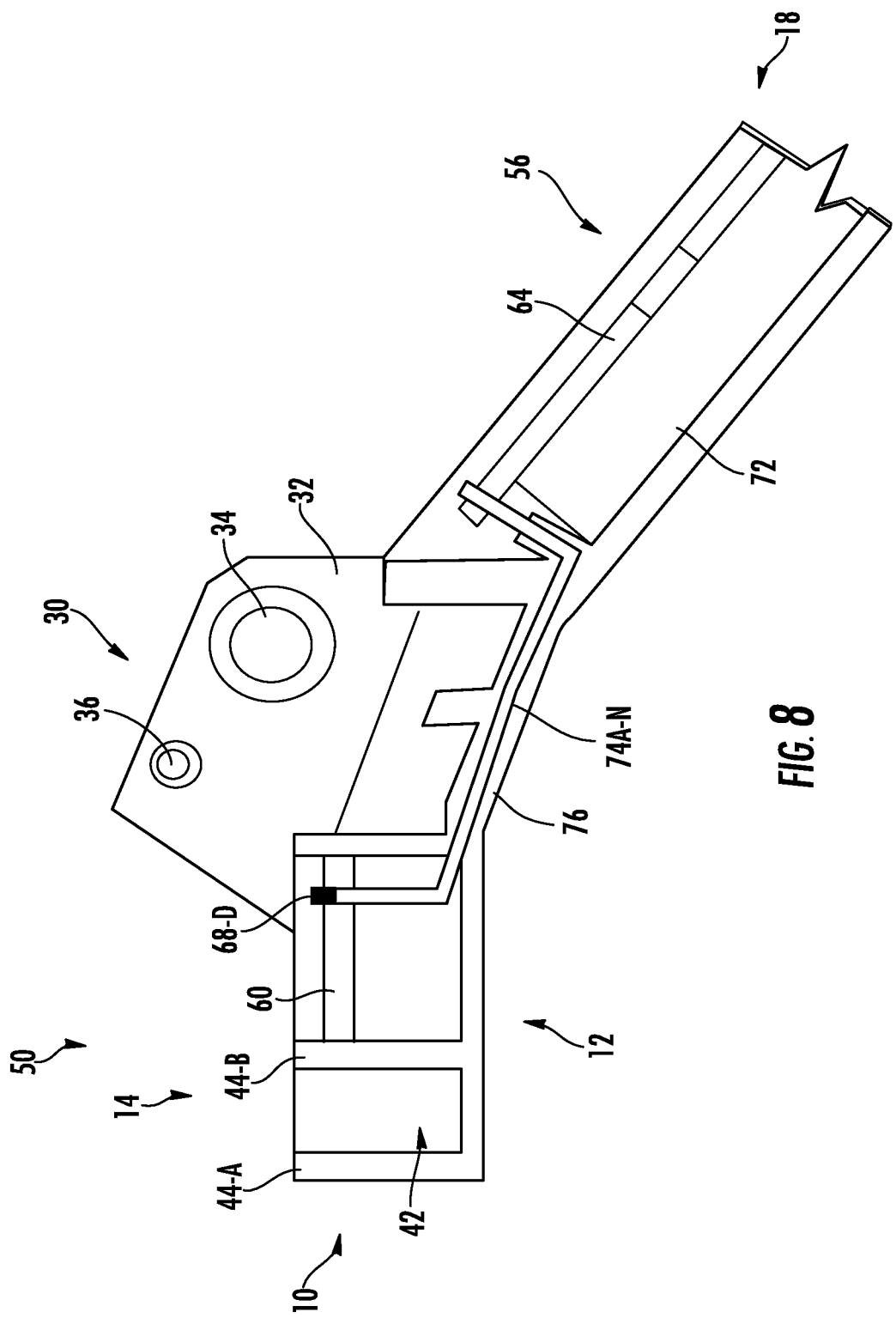
FIG. 8 is a side cutaway view illustrating connection between first and second printed circuit boards within the sensor apparatus shown in FIG. 6 according to exemplary embodiments.

Referring now to FIG. 8, an exemplary embodiment for connecting the first PCB 60 and the second PCB 64 is demonstrated. Shown is a cutaway view through the first section 12 and the second section 18 along cutline A-A of FIG. 3. In an exemplary embodiment, the position sensor 56 includes the second PCB 64 coupled to a carrier 72 disposed within the second section 18 of the housing assembly 10. As shown, the first PCB 60 is electrically connected to the second PCB 64 by one or more electrical leads 74A-N extending through and embedded within a wall 76 of the shoulder region 30. The electrical leads 74A-N connect to terminals 68D at the first end 14 of the first section 12 of the housing assembly 10. By extending the leads 74A-N through the wall 76, the position sensor 56 may be positioned separate from the speed sensors 52A-C, yet still be electrically connected via first and second PCBs 60 and 64.

Figure 9:
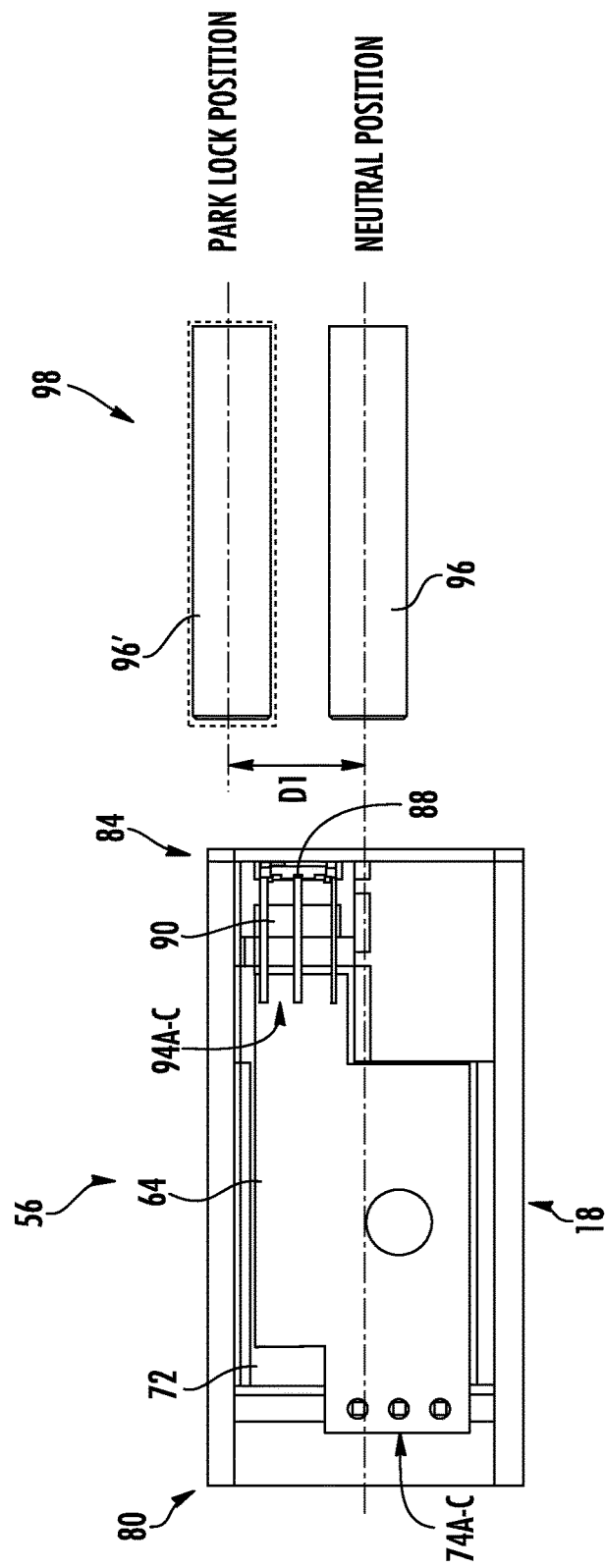
FIG. 9 is a top cutaway view illustrating the position sensor shown in FIG. 6 according to exemplary embodiments.
Figure 10:
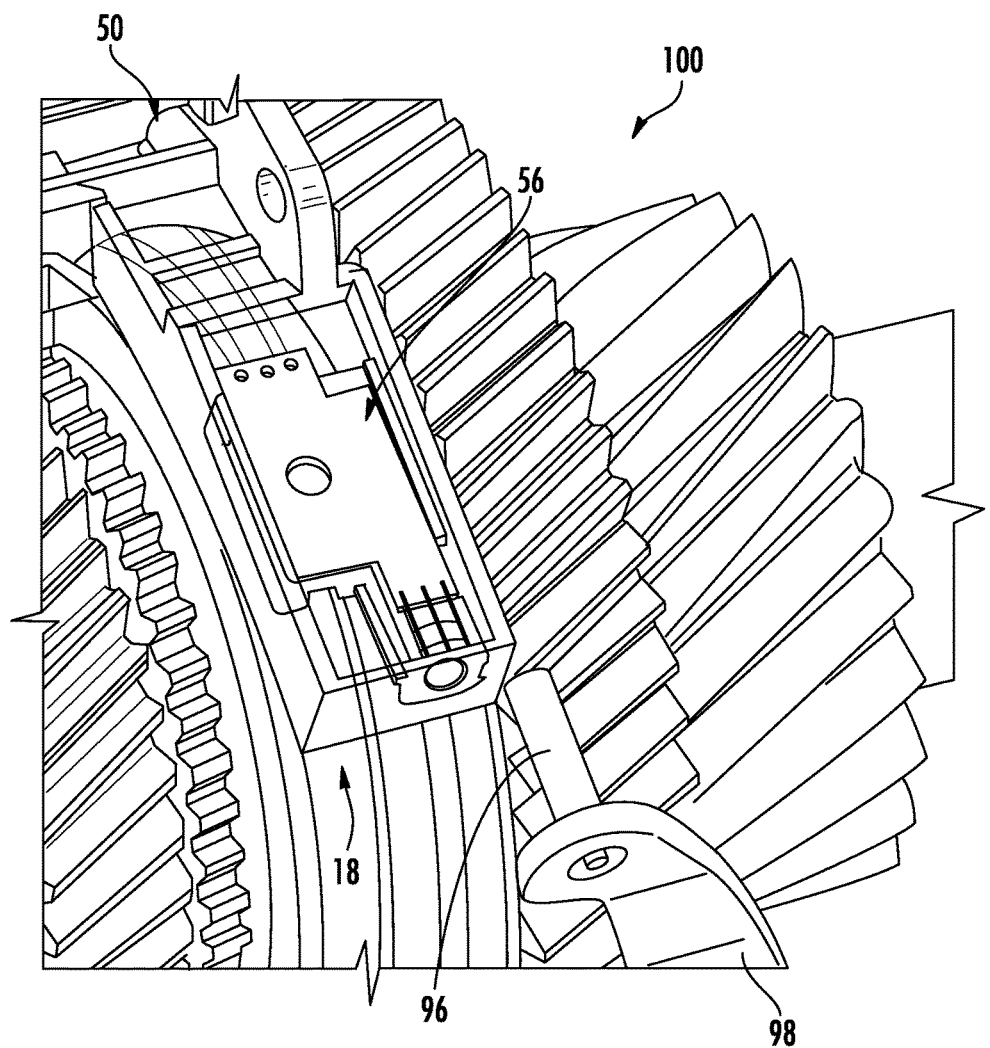
FIG. 10 is an isometric view illustrating the position sensor shown in FIG. 9 according to exemplary embodiments.

Referring now to FIGS. 9-10, the position sensor 56 in accordance with an exemplary embodiment of the present disclosure is shown. In this embodiment, the position sensor 56 includes the second PCB 64 coupled to the carrier 72, which is disposed within the second section 18. At a proximate end 80 of the second section 18, the electrical leads 74A-C connect with the second PCB 64. At a distal end 84 of the second section 18, the position sensor 56 includes a Hall effect chip 88 adjacent a magnet 90. The Hall effect chip 88 is coupled to the second PCB 64 via a set of electrical leads 94A-C, and is configured to detect movement of a fork 96 of a park lock element 98 operable with a gear assembly 100 (e.g., a dual clutch manual transmission). In one embodiment, the Hall effect chip 88 can sense the position of the fork 96, which is used to distinguish between park lock and neutral positions. The Hall effect chip 88 then outputs a distinct duty cycle based on the position of the fork 96. The output curve (e.g., positions of the fork 96 versus duty cycle) is programmable.

In one embodiment, the park lock element 98 is adapted to prevent rotation of the drive wheels (i.e. the movement of the vehicle) once the vehicle itself has been parked. The park lock element 98 may be arranged either inside the gear assembly 100 to act on a secondary shaft of the gear assembly 100, or may be arranged inside a differential. Furthermore, the park lock element 98 may include an actuator, which may be hydraulic, electric, or mechanical, adapted to arrange the park lock element 98 either in a neutral position in which the drive wheel rotation is free, or in a locking position, in which the drive wheel rotation is prevented.

In one embodiment, the Hall effect chip 88 may be integrated into a single integrated circuit that contains conditioning circuitry to amplify and otherwise modify the output of the Hall effect chip 88. As shown, the Hall effect chip 88 is mounted within the carrier 72 and perpendicular to the magnet 90 of a magnetic circuit that includes an exciter (i.e., the fork 96 being sensed). In this embodiment, the Hall effect chip 88 includes embedded magnet 90, as opposed to a magnet embedded within a fork, to reduce variations in magnetic field strength between fork manufacturers, thus increasing accuracy of the position sensor 56.

In some embodiments, the fork 96 is a high magnetic permeability element, which increases the strength of the magnetic field as the distance between the fork 96 and the magnet 90 is reduced. That is, as the fork 96 moves a distance D1 between the neutral position and the park lock position relative to the stationary Hall effect chip 88, changes in the magnetic circuit cause the magnetic flux through the Hall effect chip 88 to vary in a manner corresponding to the park lock position of the fork 96'. With the change in magnet flux there occurs a corresponding change in magnetic field strength, which increases the transverse voltage of the Hall effect chip 88. This information may then be output to the transmission control unit (not shown).

Figure 11:
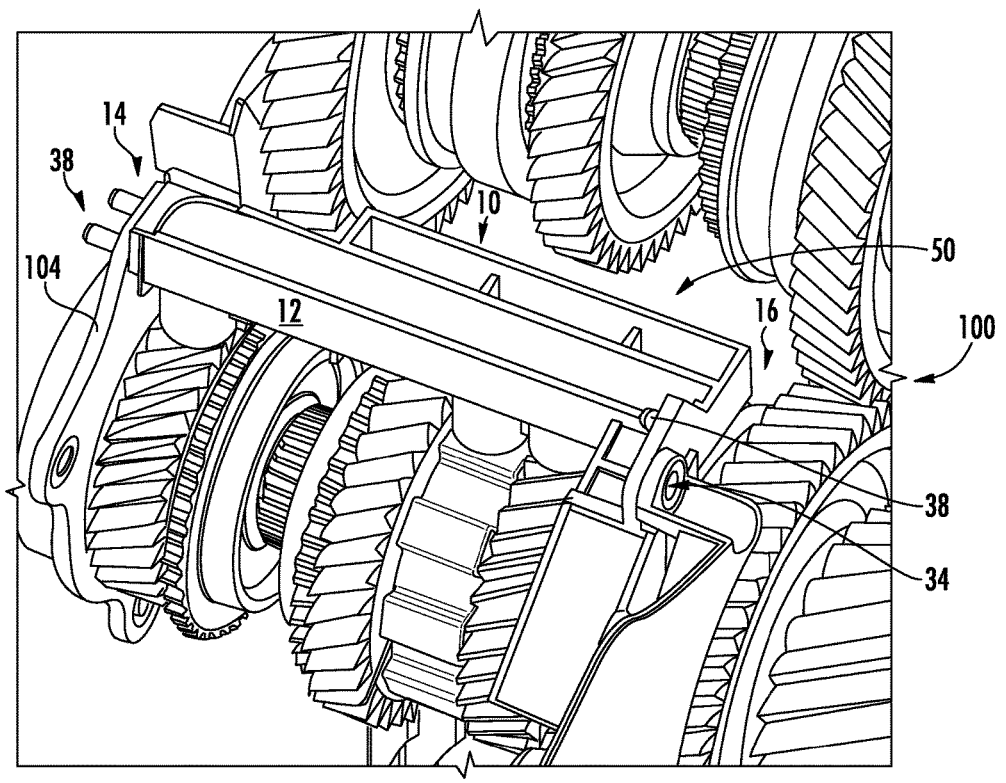
FIG. 11 is an isometric view of a gear assembly together with the housing assembly shown in FIG. 1 according to exemplary embodiments.
Figure 12:
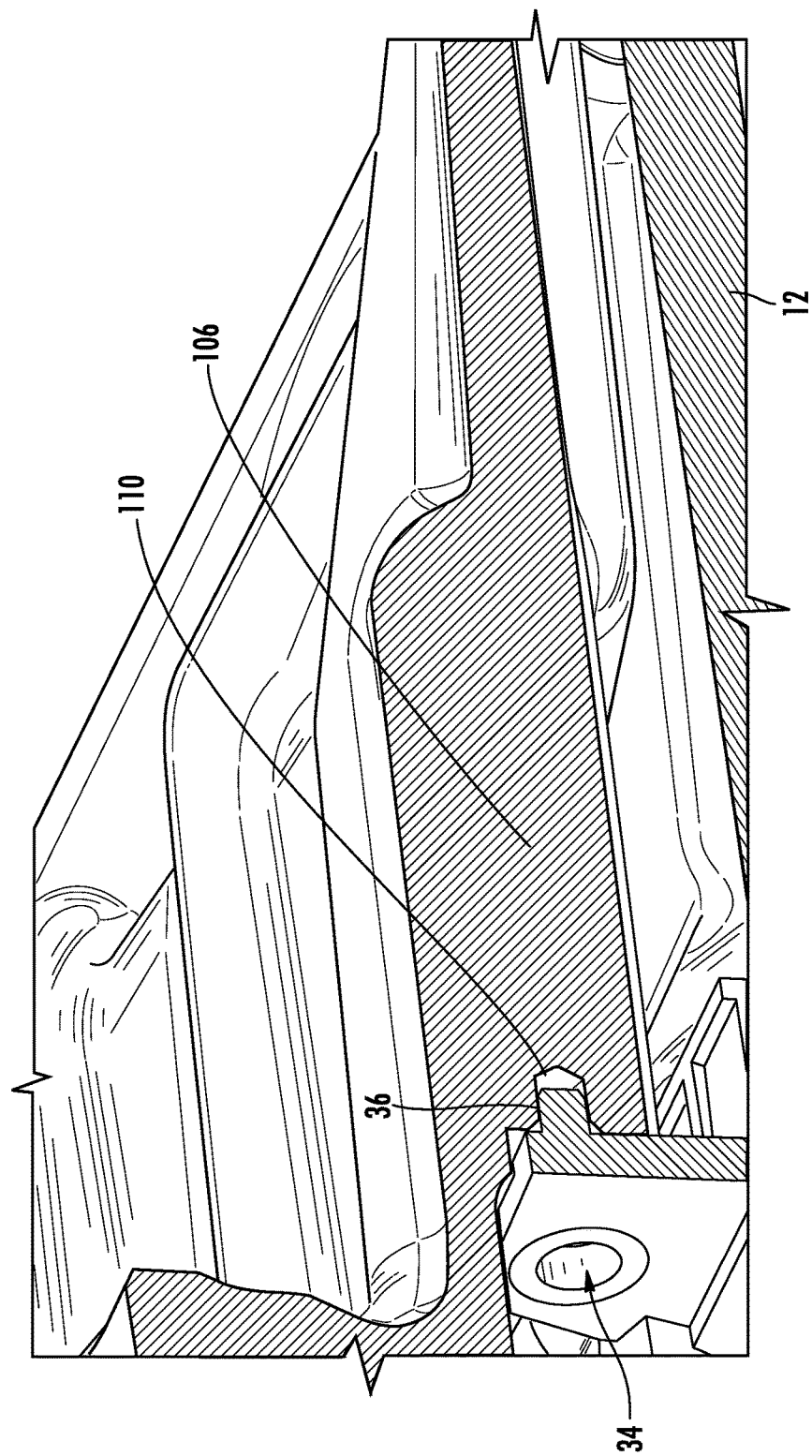
FIG. 12 is an isometric cutaway view illustrating connection of the housing assembly shown in FIG. 1 to a gear assembly cover according to exemplary embodiments.

Referring now to FIGS. 11-12, an exemplary embodiment of the sensor apparatus 50 coupled to the gear assembly 100 is shown. In this embodiment, the first section 12 of the housing assembly 10 is coupled at the first end 14 to a flange 104 via set of pins 38, which are operably engaged with a corresponding set of openings in the flange 104. At the second end 16, the housing assembly 10 is coupled to the gear assembly 100 via the mounting screw hole 34. The housing assembly 10 is further coupled to the gear assembly cover 106 using the pin 36, which engages a corresponding opening 110 in the gear assembly cover 106, as more clearly shown in FIG. 12.

Figure 13:
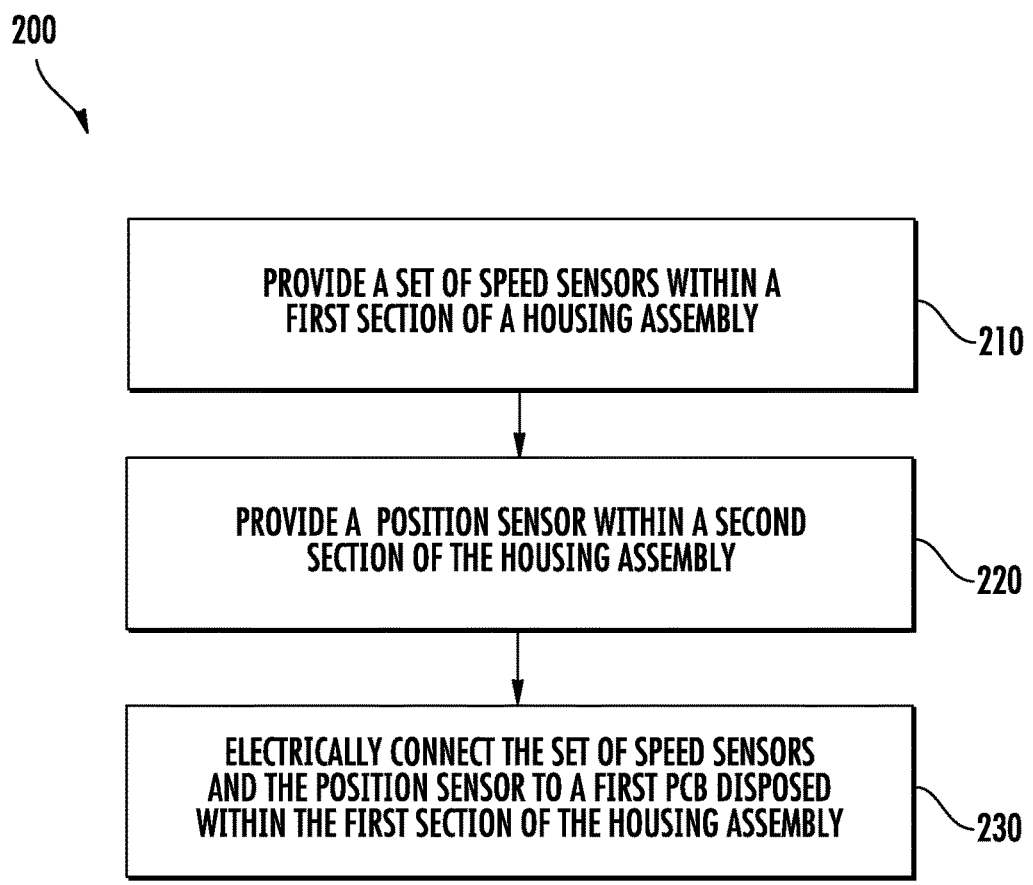
FIG. 13 is a flowchart illustrating an exemplary method according to exemplary embodiments.

Referring now to FIG. 13, a flow diagram illustrating an exemplary method 200 for monitoring a gear assembly in accordance with the present disclosure is shown. The method 200 will be described in conjunction with the representations of the housing assembly 10 and/or the sensor apparatus 50 shown in FIGS. 1-12.

Method 200 includes providing a set of speed sensors within a first section of a housing assembly, as shown in block 210. In some embodiments, the set of speed sensors is configured to detect rotational speed of one or more gears of the gear assembly. In some embodiments, the set of speed sensors include two (2) transmission input shaft speed sensors and one (1) transmission output shaft speed sensor.

Method 200 further includes providing a position sensor within a second section of the housing assembly, as shown in block 220. In some embodiments, the position sensor is configured to detect a position of a park lock element.

Method 200 further includes electrically connecting the set of speed sensors and the position sensor to a first printed circuit board (PCB) disposed within the first section of the housing assembly, as shown in block 230. In some embodiments, a set of terminals electrically connect each of the set of speed sensors and the position sensor to the first PCB. In some embodiments, the sensor apparatus includes one or more electrical leads connecting the position sensor to the first PCB.

In view of the foregoing, at least the following advantages are achieved by the embodiments disclosed herein. Firstly, the modular sensor apparatus for the gear assembly incorporates a plurality of sensors within the housing, thus satisfying space constraints and optimizing placement of each sensor. Secondly, the sensor apparatus is compatible with existing speed and position sensors, thus providing an easier retro-fit. Thirdly, a single PCB connects each sensor of the sensor apparatus, thus saving space and cost. Fourthly, the Hall effect sensor of the position sensor includes an embedded magnet, as opposed to a magnet embedded within a fork, to reduce variations in magnetic field strength between fork manufacturers, and thus increasing accuracy of the position sensor.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A sensor apparatus, comprising:
   a housing assembly including a first section and a second section coupled to the first section;
   a set of speed sensors disposed within the first section, the set of speed sensors configured to detect rotational speed of one or more gears of a gear assembly;
   a position sensor disposed within the second section, the position sensor configured to detect a position of a park lock element operable with the gear assembly; and
   a first printed circuit board (PCB) disposed within the first section of the housing assembly, wherein the set of speed sensors and the position sensor are connected to the first PCB.

2. The sensor apparatus of claim 1, further comprising a set of terminals to electrically connect each of the set of speed sensors and the position sensor to the first PCB.

3. The sensor apparatus of claim 1, further comprising one or more electrical leads connecting the position sensor to the first PCB.

4. The sensor apparatus of claim 3, further comprising a second PCB coupled to the position sensor, the second PCB disposed within the second section of the housing assembly.

5. The sensor apparatus of claim 4, the second section of the housing assembly including a shoulder region disposed between the first PCB and the second PCB, wherein the one or more electrical leads are embedded within a frame of the shoulder region.

6. The sensor apparatus of claim 1, the position sensor comprising a Hall effect sensor adjacent a magnet at a distal end of the second section of the housing assembly, wherein the Hall effect sensor is configured to detect movement of the park lock element.

7. The sensor apparatus of claim 1, the first section of the housing assembly having a first end and a second end, wherein the second section of the housing assembly is coupled to the first section of the housing assembly at the second end.

8. The sensor apparatus of claim 1, wherein the first section of the housing assembly is arranged substantially perpendicular to the second section of the housing assembly.

9. The sensor apparatus of claim 1, further comprising a set of pins coupled to the first end of the first section of the housing assembly for coupling the housing assembly to a gear assembly cover.

10. A sensor system comprising:
    a set of speed sensors disposed within a first section of a housing assembly, the set of speed sensors configured to detect rotational speed of one or more gears of a gear assembly; and a position sensor disposed within a second section of the housing assembly, the position sensor configured to detect a position of a park lock element operable with the gear assembly, wherein the set of speed sensors and the position sensor are electrically connected to a first printed circuit board (PCB) disposed within the first section of the housing assembly, and wherein the first section of the housing assembly is coupled to the second section of the housing assembly.

11. The sensor system of claim 10, each of the set of speed sensors and the position sensor comprising a set of terminals electrically connected to the first PCB.

12. The sensor system of claim 10, the position sensor comprising one or more electrical leads for connecting to the first PCB.

13. The sensor system of claim 12, the position sensor coupled to a second PCB disposed within the second section of the housing assembly.

14. The sensor system of claim 13, the one or more electrical leads embedded within a frame of a shoulder region of the housing assembly, the shoulder region disposed between the first PCB and the second PCB.

15. The sensor system of claim 10, the position sensor comprising a Hall effect sensor adjacent a magnet at a distal end of the second section of the housing assembly, wherein the Hall effect sensor is configured to detect movement of the park lock element.

16. The sensor system of claim 10, the first section of the housing assembly having a first end and a second end, wherein the second section of the housing assembly is coupled to the first section of the housing assembly at the second end, and wherein the first section of the housing assembly is arranged substantially perpendicular to the second section of the housing assembly.

17. A monitoring method comprising:
    providing a set of speed sensors within a first section of a housing assembly, the set of speed sensors configured to detect rotational speed of one or more gears of a gear assembly;
    providing a position sensor within a second section of the housing assembly, the position sensor configured to detect a position of a park lock element operable with the gear assembly, wherein the first section of the housing assembly is coupled to the second section of the housing assembly; and
    electrically connecting the set of speed sensors and the position sensor to a first printed circuit board (PCB) disposed within the first section of the housing assembly.

18. The method of claim 17, further comprising providing a second PCB within the second section of the housing assembly, the second PCB coupled to the position sensor.

19. The method of claim 18, further comprising electrically connecting the first PCB to the second PCB using one or more electrical leads located within a shoulder region of the housing assembly.

20. The method of claim 17, further comprising coupling the housing assembly to a gear assembly cover.

\* \* \* \* \*